United States Patent [19]

Cires et al.

[11] Patent Number: 5,079,912
[45] Date of Patent: Jan. 14, 1992

[54] CONVERGENT SIDE DISK COOLING SYSTEM FOR A TWO-DIMENSIONAL NOZZLE

[75] Inventors: Alfredo Cires, Palm Beach Gardens; Richard D. Dickinson, Jupiter, both of Fla.

[73] Assignee: United Technologies Corporation, Hartford, Conn.

[21] Appl. No.: 536,909

[22] Filed: Jun. 12, 1990

[51] Int. Cl.[5] ............... F02K 1/00; F02K 11/00; B64D 33/04; B64C 30/00
[52] U.S. Cl. ............................. 60/228; 60/230; 60/266; 239/127.1; 239/265.19; 244/117 A
[58] Field of Search ............... 244/117 A; 239/127.1, 239/127.3, 265.19; 60/228, 232, 233, 230, 266, 271

[56] References Cited

U.S. PATENT DOCUMENTS

| | | | |
|---|---|---|---|
| 4,098,076 | 7/1978 | Young | 60/266 |
| 4,739,931 | 4/1988 | Stogner | 239/127.1 |
| 4,747,542 | 5/1988 | Cires | 60/266 |
| 4,778,109 | 10/1988 | Jourdain | 60/230 |
| 4,819,876 | 4/1989 | Thayer | 60/232 |
| 4,934,600 | 6/1990 | Nash | 239/127.1 |
| 4,955,541 | 9/1990 | Carteron | 239/127.1 |

*Primary Examiner*—Richard A. Bertsch
*Assistant Examiner*—Alfred Basichas
*Attorney, Agent, or Firm*—Christopher T. Hayes

[57] ABSTRACT

Disclosed is an apparatus and a method for cooling a rotatable convergent side disk in a two-dimensional nozzle for a gas turbine engine, in which coolant is supplied and exhausted through concentric conduits, the cooling requirements of a liner assembly are reduced by use of a thermal barrier coating, and exhaust gas from the nozzle is prevented from aspirating into the side disk by use of a liner which is impervious to the exhaust gas.

9 Claims, 3 Drawing Sheets

CONVERGENT SIDE DISK COOLING SYSTEM FOR A TWO-DIMENSIONAL NOZZLE

The Government has the rights in this invention pursuant to Contract No. F33615-84-C-3015 awarded by the Department of the Air Force.

TECHNICAL FIELD

The present invention relates to convergent side disk cooling liners on two-dimensional nozzles for gas turbine engines.

BACKGROUND ART

The use of convergent side disks in two-dimensional, gas turbine engine exhaust nozzles is well known in the art. Examples of such side disks are described in U.S. Pat. Nos. 4,819,876; 4,690,329 and 4,753,392. During engine operation, each of the convergent side disks rotates freely about a fixed axis to position the convergent flap secured thereto.

Due to the intense heat of the engine exhaust gas passing through the nozzle, the convergent side disks must be cooled to prevent life reduction, or failure, of the side disk components. However, due to the rotating nature of the side disks, limited means and methods are available for supplying coolant to, and exhausting coolant from, the side disks.

In the past, attempts to cool convergent side disks have included using coolant supplied to the side disks to provide impingement cooling of the inner surface of a liner and film cooling of the gas path surface of the liner. In this scheme, the coolant is supplied through a supply conduit which is concentric with the side disk's respective axis of rotation, and the spent cooling air is exhausted through the liner into the engine exhaust gas flow to provide film cooling of the liner. Unfortunately, at certain engine operating conditions, coolant supply pressure at the liner is less than the prevailing static pressure of the exhaust gas, resulting in reduced cooling flow and/or aspiration of the hot exhaust gas through the liner, and liner temperatures that exceed liner material capabilities. Although the potential for such aspiration is inherent in the use of a perforated liner, the film cooling provided by the perforated liner has been considered necessary, as the impingement cooling alone was not effective enough to adequately cool the liner.

DISCLOSURE OF INVENTION

It is therefore an object of the present invention to provide a cooling means for a side disk which prevents aspiration of engine exhaust gas through the liner at all engine operating conditions.

Another object of the present invention is to reduce the cooling requirements of the convergent side disk liner by reducing heat transfer from the exhaust gas to the liner.

Another object of the present invention is to increase the effectiveness of impingement cooling of the convergent side disk liner and eliminate the need for film cooling.

According to the present invention, a convergent side disk liner assembly is provided in which coolant is both supplied to, and exhausted from, the side disk through supply and exhaust conduits which are concentric with the axis of rotation of the side disk. Spent coolant is dumped overboard of the engine, providing a large pressure drop for the coolant to maximize the effectiveness of impingement cooling of the liner. The liner is imperforate, thereby preventing aspiration of engine exhaust gas. The outer surface of the liner is coated with a thermal barrier coating which impedes heat transfer from the hot exhaust gas to the liner, thereby reducing the cooling requirements of the liner. The inner surface of the liner is exposed to an impingement plate which includes a plurality of jet orifices, and a coolant exhaust orifice which extends through the plate connecting the opposed faces thereof. A rim flange seals the imperforate liner to the outer face of the impingement plate, providing a cooling air exhaust plenum therebetween.

The inner face of the impingement plate is mounted to the face of the side disk, with a plenum lip seal secured therebetween. The lip seal provides a space between the impingement plate and the face of the side disk, which serves as a plenum to distribute cooling air to the jet orifices in the impingement plate. The cooling air exhaust conduit is connected to the cooling air exhaust orifice and extends through the face of the side disk and the supply conduit to a cooling air exhaust port.

During engine operation, cooling air fed to the convergent side disk through the supply conduit passes through perforations in the face of the side disk to the supply plenum, where it is distributed to the jet orifices. The air passes through the orifices, forming cooling jets which impinge the inner surface of the liner. The cooling air is then exhausted through the exhaust conduit and dumped overboard.

By dumping the spent cooling air to ambient pressure, a much higher pressure ratio is established across the impingement plate than can be obtained by dumping the spent cooling air back into the engine exhaust gas path, making the impingement cooling effective enough to cool the coated liner without the need of film cooling. Consequently, the film cooling holes required on previous convergent side disk liners are unnecessary in the present invention, and aspiration of engine exhaust gas through the convergent side disk liner is prevented at all engine operating conditions.

The foregoing and other features and advantages of the present invention will become more apparent from the following description and accompanying drawings.

BRIEF DESCRIPTION OF DRAWINGS

FIG. 4a is a view of the head of the bolt shown in FIG. 4 taken along line 4a—4a.

BEST MODE FOR CARRYING OUT THE INVENTION

Figure 1:
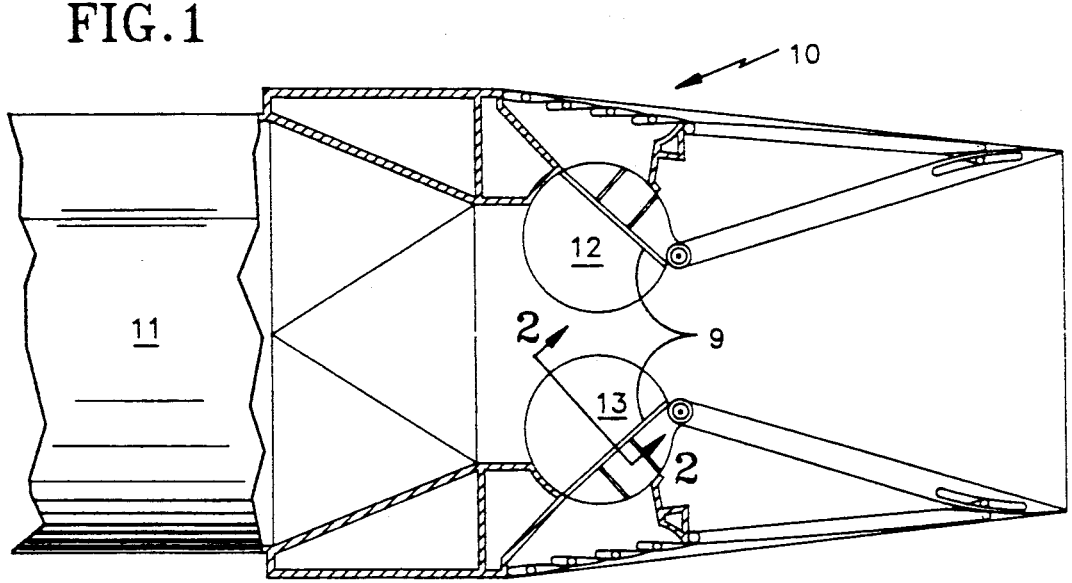
FIG. 1 is a cross section of a typical two-dimensional nozzle showing the location of the convergent side disks.

Shown in FIG. 1 is a two-dimensional exhaust nozzle 10 incorporating the present invention. Hot exhaust gas from the gas turbine engine 11 flows axially aftward along the upper and lower convergent side disks 12, 13. The side disks 12, 13 are rotatable about an axis of rotation 14 to provide orientation of the convergent flaps 9 as desired.

Figure 2:
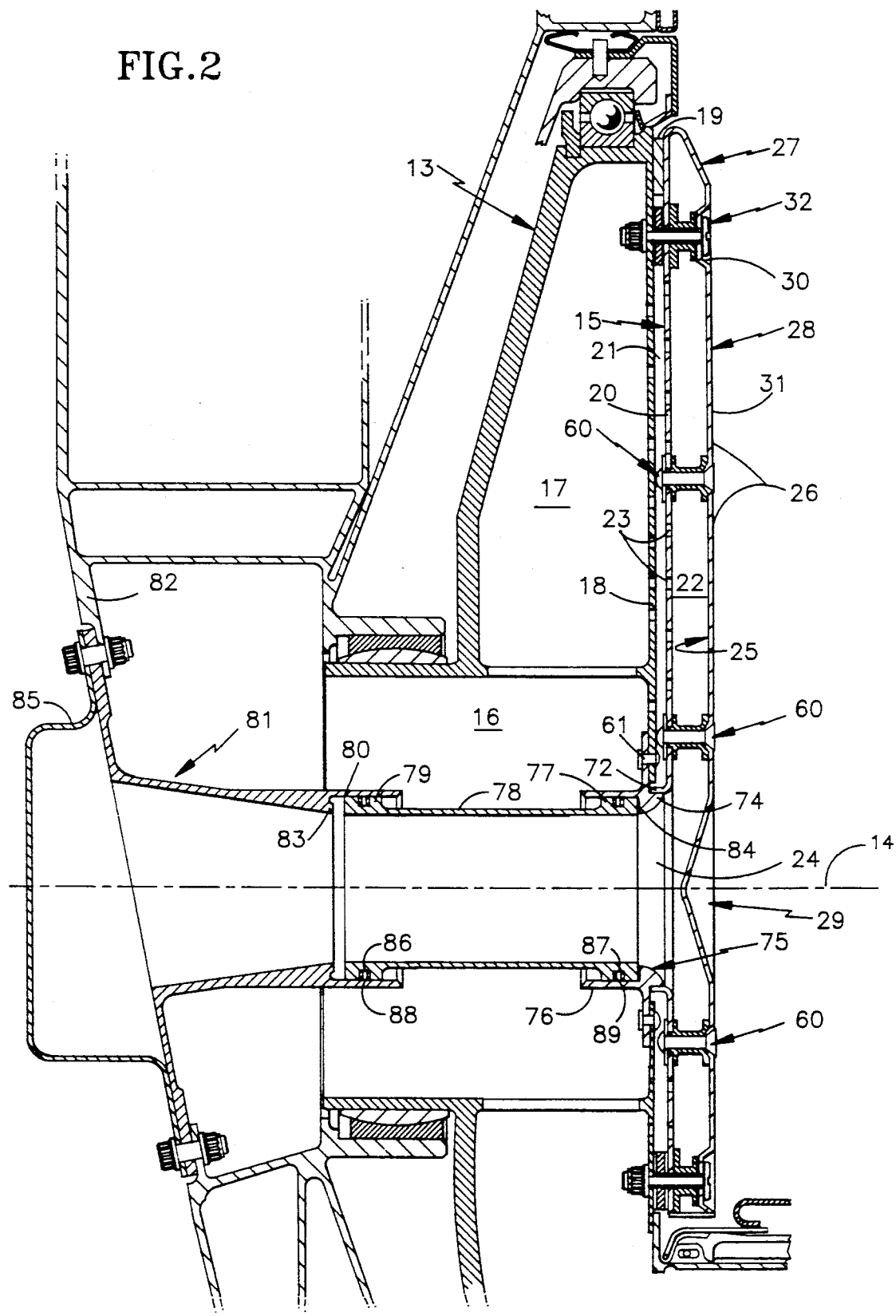
FIG. 2 is a cross section of one of the convergent side disks incorporating the present invention, taken along line II—II of FIG. 1.

To protect the components of the side disks 12, 13 from the intense heat of the exhaust gas, a cooled liner assembly 15 is secured to each side disk as shown in FIG. 2. Although only the lower side disk 13 is shown in FIG. 2, it is to be understood that the upper side disk 12 and liner assembly are identical. Cooling air is supplied to each of the convergent side disks 12, 13 through a supply conduit 16 which is concentric with the axis of rotation 14 of the side disk 12, 13. The supply conduit 16 communicates with the substantially hollow interior section 17 of the convergent side disk 12, 13, thereby permitting flow of cooling air to the liner assembly 15.

Figure 3:
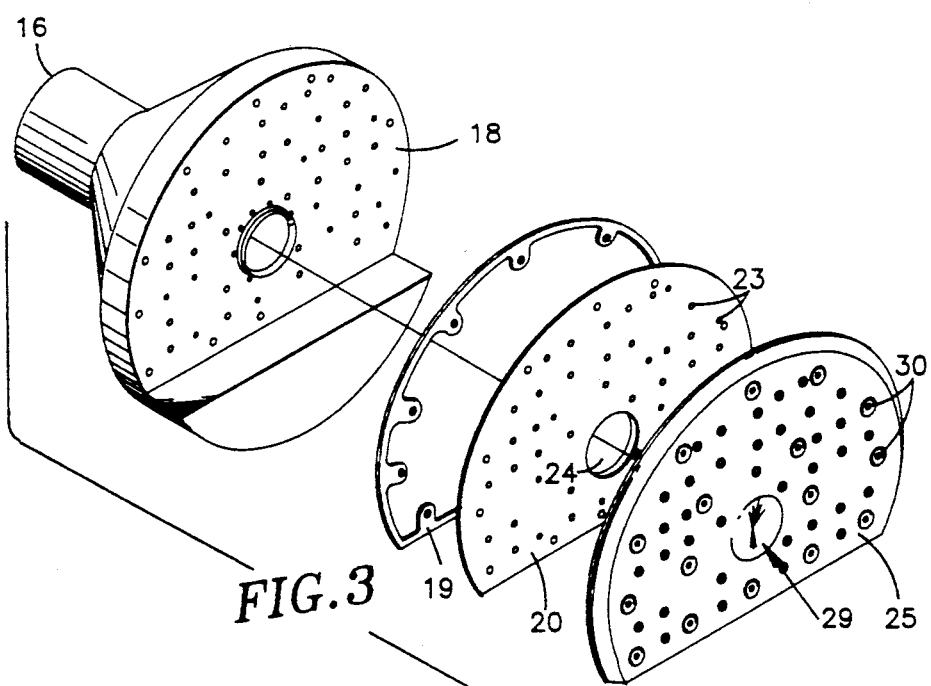
FIG. 3 is an exploded view of the liner assembly of the present invention.

The convergent side disk 13 includes a face 18 which is perforated so as to permit cooling air from the interior 17 to pass through to the liner assembly 15. As shown in FIG. 3, a plenum lip seal 19 adjacent the perimeter of the face 18 permits the impingement plate 20 to be secured to the face 18 in spaced relation thereto, forming a cooling air supply plenum 21 between the face 18 and the impingement plate 20. The impingement plate 20 includes jet orifices 23 which extend through the impingement plate 20, and an exhaust port 24 which is concentric with the supply conduit 16.

The liner 25 is generally planar in shape, comprising a flat wall 26 and a skirt flange 27 which extends along the perimeter of the liner 25 for sealing the liner 25 to the impingement plate 20. The exhaust plenum 22 between the impingement plate 20 and the liner 25 is connected to the exhaust port 24. The liner 25 and the impingement plate 20 are preferably made of HAYNES TM 188, a trademark of Cabot Corporation for a heat resistant alloy containing by weight approximately 41.3% cobalt, 22.0 chromium, 22.0% nickel, 0.1% carbon, 14.5% tungsten, 0.075% lanthanum, and 0.35% silicon.

The liner 25 is impervious to the engine exhaust gas to prevent aspiration thereof through the liner 25. The outer surface of the liner 25 is coated with a thermal barrier coating 28 which may be of the type disclosed in U.S. Pat. No. 4,861,618, and may be applied as disclosed therein. The thermal barrier coating reduces the rate of heat transfer from the exhaust gas to the liner 25, reducing the cooling requirements of the liner.

Since impingement cooling of the liner is not available in the region near the exhaust port 24, the outer surface of the liner includes a conical indentation 29 to remove that portion of the liner 25 from the flow path of the exhaust gas, thereby reducing the cooling requirements of that portion of the liner 25. The outer surface further includes a plurality of bolt recesses 30 adjacent the perimeter of the liner and the conical indentation 29. At the center of each bolt recess 30 is a hole 31 which receives the bolts 32 that fasten the liner 25 to the impingement plate 20 and to the side disk face 18.

Figure 4:
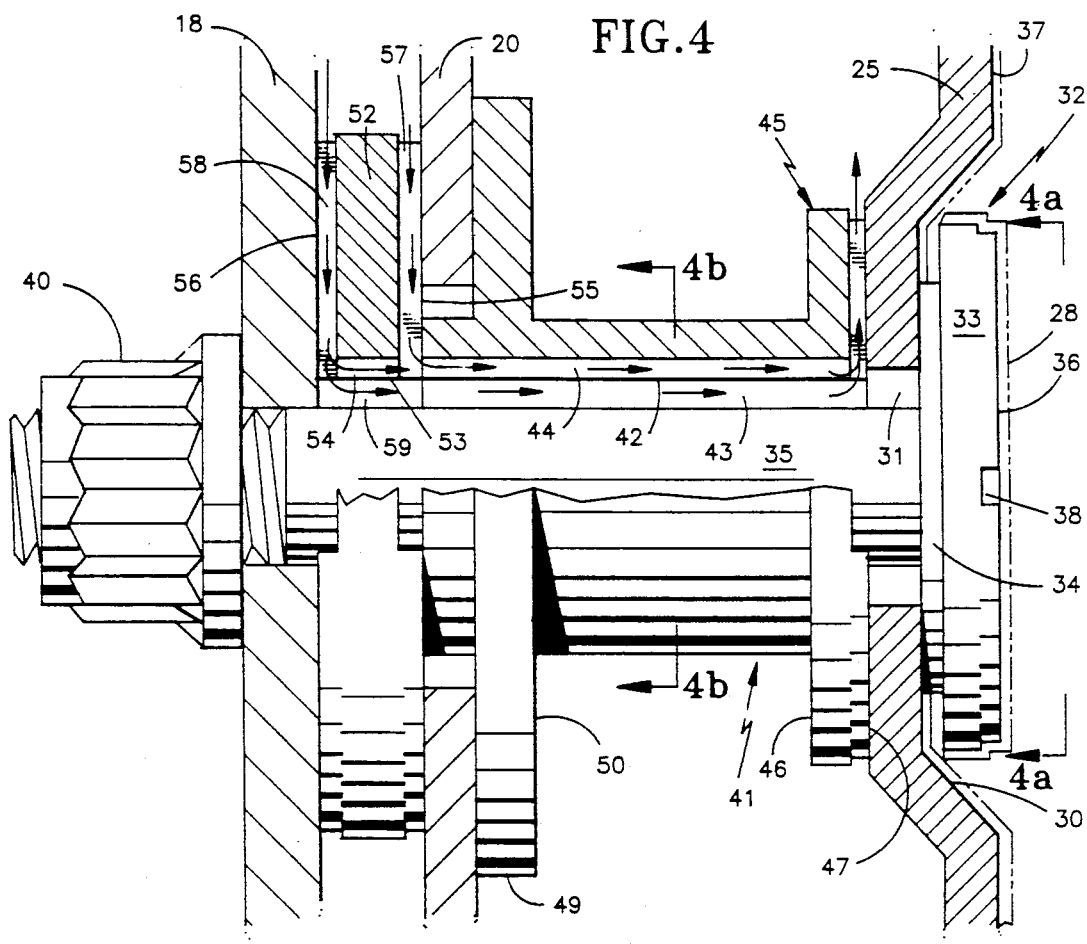
FIG. 4 is a cross section of one of the bolts of the liner assembly.

A typical bolt assembly is shown in FIG. 4, and includes a head 33 with an integral liner flange 34, and a bolt shaft 35. The depth of the bolt recess 30 is essentially equal to the combined thickness of the head 33 and integral liner flange 34, so that after assembly the surface of the head 36 of the bolt is flush with the non-recessed outer surface 37 of the liner. The diameter of the integral liner flange 34 is substantially larger than the diameter of the recess hole 31, so that the integral flange 34 will seal the recess hole 31 even if the bolt 32 is not centered therein.

Figure 4A:
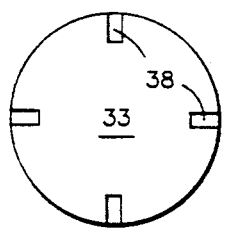

As shown in FIG. 4a, the head 33 of the bolt includes four perimeter notches 38 which are used to prevent rotation of the bolt 32 during assembly. The perimeter notches 38 permit the liner 25 to be assembled without incurring damage to the bolt head thermal barrier coating 28, damage which could occur if bolts having other notches, such as "Phillips head" notches, were used. Each bolt 32 extends through a hole 39 in the impingement plate 20, and a hole in the face 18, where it is secured by a nut 40.

Figure 4B:
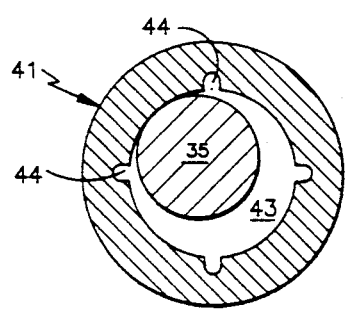
FIG. 4b is a view of the shaft of the bolt shown in FIG. 4 taken along line 4b—4b.

The liner is spaced from the impingement plate by a bolt spool 41 that includes a bolt spool bore 42 extending the length of the bolt spool 41. As shown in FIG. 4b, the diameter of the bolt spool bore 42 is substantially larger than the diameter of the bolt shaft 35, providing a spool plenum 43 therebetween to permit passage of cooling air through the bolt spool bore 42 despite the presence of the bolt shaft 35. To further ensure that the flow of cooling air is through the bolt spool 41 is not impeded by the bolt shaft 35, four longitudinal channels 44 extending the length of the bolt spool bore 42 protrude into the inner diameter of the bolt spool 41.

At the first end 45 of the bolt spool, adjacent the liner, is a first cylindrical flange 46 which forms one end of the bolt spool 41. The surface 47 of the flange 46 which supports the liner 25 includes four end channels 48 which extend from the outer diameter of the bolt spool 41 to the inner diameter thereof, where each end channel 48 connects with one of the longitudinal channels 44. Adjacent the second end 49 of the bolt spool 41, opposite the liner 25, is a second cylindrical flange 50 having a somewhat larger diameter than the first cylindrical flange 46. The second flange 50 is offset from the second end 49 of the bolt spool 41, providing a stub 51 which extends through a hole 39 in the impingement plate 20 and supports the second flange 50 in spaced relation to the bolt washer 52.

The length which the stub 51 protrudes from the second flange 50 is slightly greater than the thickness of the impingement plate 20, so that the bolt washer 52 and the second flange 50 secure the impingement plate 20 therebetween without binding the impingement plate 20. This arrangement prevents distortion of the liner 25 assembly during operation of the engine despite large thermal variations between the liner 25 and the impingement plate 20. The diameters of the second flange 50 and the bolt washer 52 are sufficiently large to ensure that, should the bolt spool 41 and washer 52 shift with respect to one another, the impingement plate 20 will remain secured therebetween.

The bolt washer 52 acts as a spacer between the impingement plate 20 and the face 18 of the side disk 4. The bolt washer 52 has a bolt washer bore 53 having essentially the same diameter as the bore 42 in the bolt spool 41, and includes four cooling channels 54 which extend axially along the washer bore 53, protruding into the inner diameter of the washer. Each end 55, 56 of the bolt washer 52 includes four channels 57, 58 equally spaced angularly from each other which extend radially from the bolt washer bore 53 of the bolt washer 52 and connect with one of the channels 54 at the inner diameter of the bolt washer 52. The channels 54, 57, 58 of the bolt washer 52 communicate with the washer plenum 59 and the channels 44, 48 of the bolt spool 41 to permit cooling air to circulate around the bolt shaft 35 and the liner adjacent the recess 30. Those bolt washers 52 which cooperate with bolts 32 adjacent the perimeter of the liner are integral with the plenum lip seal 19 for ease of assembly and to secure the plenum lip seal 19 in place.

Figure 5:
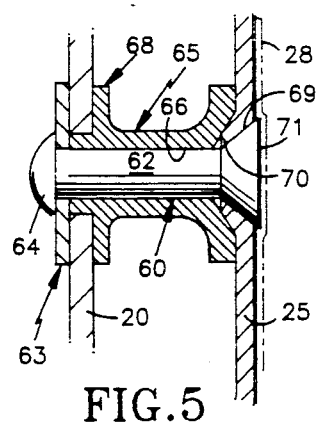
FIG. 5 is a cross section of one of the rivets of the liner assembly.

Further supporting the liner 25 from the impingement plate 20 are a plurality of rivets 60. The rivets 60 are generally spaced in a grid pattern across the liner 25 to support the liner 25 in those areas where the bolts 32 do not. A typical rivet 60 is shown in FIG. 5.

The shaft 62 of each rivet 60 extends through a rivet washer 63 which secures the head 64 of the rivet 60. The rivet spool 65 is generally similar to the bolt spool 41 and bears upon the rivet washer 63 so that the rivet spool 65 and rivet washer 63 do not bind the impingement plate 20. However, the bore 66 in the rivet spool 65 and the rivet washer 63 is essentially the same diameter as the shaft 62 of the rivet 60 prior to assembly, and neither includes any cooling air channels. Furthermore, the first cylindrical flange 67 of the rivet spool 65 is more massive than the second cylindrical flange 68 of the rivet spool, to provide adequate heat transfer from the liner 25 to the rivet spool 65 in the absence of cooling air channels.

Each dimple 69 in the liner 25 includes a hole 70 which receives the rivet shaft 62. During assembly, the head 64 of the rivet 60 is supported and the opposite end 71 is struck, flaring the end 71 of the rivet 60 into the dimple 69. The compressive force which flares the end 71 also flares the shaft 62 of the rivet 60 along a significant portion of its length adjacent the liner 25. The rivet shaft 62 thus expands into intimate contact with the rivet spool 65, aiding heat transfer from the rivet 60 to the spool 65. The flared end 71 of the rivet 60 is preferably flush with the liner 25, to permit a smooth coating of the thermal barrier material 28. The bolts 32, rivets 60, spools 41, 65, washers 52, 63, and nuts 40 are preferably made of HAYNES TM 25, a trademark of Cabot Corporation for an alloy containing by weight approximately 53.4% cobalt, 20.0% chromium, 10.0% nickel, 0.10% carbon, 15.0% tungsten, and 1.5% manganese.

A flange seal 72 at the perimeter of the exhaust port 24 extends from the impingement plate 20 toward the opening 73 in the face 18. This flange seal 72 cooperates with the rim 74 of an exhaust coupling 75 which is riveted to the face 18 of the convergent side disk. The exhaust coupling 75 extends through the opening 73 in the face 18 and is shaped so as to ensure that the bracket rivets 61, which secure the exhaust coupling 75 to the face 18, do not interfere with the rivets 60 and bolts 32 of the liner 25.

Opposite the rim 74 is an annular exhaust sleeve 76 which receives the first end 77 of the tubular exhaust conduit 78. The second end 79 of the exhaust conduit 78 is received within an exhaust sleeve 80 of the exhaust bracket 81, which is in turn bolted to the static structure 82 of the nozzle 10. Each of the exhaust sleeves 76, 80 includes a stop 83, 84 which limits axial travel of the exhaust conduit 78. Exterior of the static structure 82 is a deflector 85 which deflects spent cooling air aft of the nozzle 10.

Adjacent each end of the exhaust conduit 78 is a groove 86, 87 which receives a split-ring exhaust conduit seal 88, 89. These seals 88, 89 prevent leakage of cooling air from the supply conduit 16 directly into the exhaust conduit 78, and permit rotational movement between the exhaust coupling 75 and the exhaust bracket 81. In addition, the seals 88, 89 permit a certain amount of translational movement of the exhaust coupling 75 with respect to the exhaust bracket 81, reducing the criticality of coaxial alignment of the exhaust sleeves 76, 80.

During operation of the engine, pressurized cooling air is supplied to the hollow interior 17 of each of the convergent side disks 12, 13. The cooling air passes through the perforations in the face 18 to the supply plenums, which distribute the cooling air to the various jet orifices 23 of the impingement plate 20. Due to the relatively small area presented by the jet orifices 23 and the high pressure ratio across the impingement plate 20, the cooling air experiences a substantial pressure drop across the impingement plate 20, resulting in a high velocity jet of cooling air projecting from each jet orifice 23. Each of these jets impinges the inner side of the liner 25, producing turbulent heat exchange between the liner 25 and the cooling air.

Cooling air likewise enters the channels of the bolt washers 52, is ducted through the bolt spools 41, and exits through the channels 48 of the first cylindrical flanges 45, absorbing heat from the bolt shafts 35 in the process. The rivets 60 are cooled by the turbulent cooling air as it flows through the exhaust plenum 22 toward the exhaust port 24. The spent cooling air is then exhausted through the exhaust conduit 78 to the deflector 85, where the static pressure of the ambient atmospheric air is significantly lower than that of the spent cooling air.

The combined effects of the thermal barrier coating and the increased effectiveness of the impingement cooling provide adequate cooling of the convergent side disk without the need for film cooling. The present invention eliminates the need for film cooling, and therefore the need for the perforated liner is eliminated as well. Consequently, the liner assembly of the present invention provides adequate cooling of the convergent side disk while preventing aspiration of engine exhaust gas through the convergent side disk at all engine operating conditions.

Although this invention has been shown and described with respect to detailed embodiments thereof, it will be understood by those skilled in the art that various changes in form and detail thereof may be made without departing from the spirit and scope of the claimed invention.

We claim:

1. A liner assembly for a rotatable side disk of a two-dimensional nozzle which receives exhaust gas from a gas turbine engine, said side disk having a planar face through which coolant from a coolant supply means is delivered, said liner assembly attached to said face and comprising:

liner means for shielding said side disk from said exhaust gas, said liner means impervious to said exhaust gas;

impingement means for impinging said liner means with coolant from said supply means, said impingement means comprising an impingement plate having a plurality of jet orifices for impinging said liner means with said coolant and at least one exhaust orifice in said impingement plate, said impingement means secured in spaced relation to said liner means defining an exhaust plenum therebetween; and, exhaust means for exhausting said coolant from said exhaust plenum, said exhaust means including an exhaust assembly which communicates with said exhaust orifice for exhausting said coolant from said exhaust plenum, said exhaust assembly joined to said impingement means and substantially concentric with said supply means.

2. The liner assembly of claim 1 wherein said liner means comprises a liner having a first surface and a second surface, said first surface contacting the exhaust gas and opposed to said second surface and including a thermal barrier coating to impede heat transfer from said exhaust gas to said liner.

3. The liner assembly of claim 2 wherein said exhaust assembly is connected to said impingement plate, said exhaust means further comprises seal means on said impingement plate adjacent said exhaust orifice, and said seal means is interposed between said impingement plate and said exhaust assembly to prevent leakage of said coolant therebetween.

4. A liner assembly for a rotatable side disk of a two-dimensional nozzle which receives exhaust gas from a gas turbine engine, said side disk having a planar face through which coolant from a coolant supply means is delivered, said liner assembly attached to said face and comprising;
  liner means for shielding said side disk from said exhaust gas, said liner means impervious to said exhaust gas;
  impingement means for impinging said liner means with coolant from said supply means, said impingement means secured in spaced relation to said liner means defining an exhaust plenum therebetween;
  exhaust means for exhausting said coolant from said exhaust plenum, said exhaust means including an exhaust assembly joined to said impingement means and substantially concentric with said supply means, said exhaust assembly comprising
  an exhaust coupling having first and second ends, said first end of said exhaust coupling in sealing contact with seal means on said impingement means, said second end of said exhaust coupling including a first exhaust sleeve,
  an exhaust bracket having first and second ends, said second end of said exhaust bracket including a second exhaust sleeve,
  an exhaust conduit having opposed ends, an exhaust conduit seal adjacent each of said opposed ends of said exhaust conduit, and each of said exhaust conduit seals engages one of said first or second exhaust sleeves to prevent leakage of coolant from said supply means directly into said exhaust conduit; and,
  a deflector having an exhaust port which communicates with ambient pressure, said deflector connector to said first end of said exhaust bracket for receiving coolant therefrom and delivering said coolant at said ambient pressure, said exhaust means isolated from said exhaust gas to prevent said exhaust gas from flowing therethrough.

5. The liner assembly of claim 4 wherein said impingement plate is secured to said second surface of said liner means by a plurality of fasteners, and at least one of said plurality of fasteners comprises a rivet received within a dimple in said liner means.

6. The liner assembly of claim 1 wherein said impingement plate is secured to said face defining a supply plenum therebetween, said impingement plate is secured to said liner means, and said exhaust plenum communicates with said exhaust means.

7. The liner assembly of claim 6 wherein said impingement plate is secured to said liner means by a plurality of fasteners, and at least one of said plurality of fasteners comprises a rivet received within a dimple in said liner means.

8. The liner assembly of claim 7 wherein said exhaust means further comprise:
  seal means adjacent said exhaust orifice which seal said exhaust assembly to said impingement plate to prevent leakage of coolant from said supply plenum to said exhaust plenum through said exhaust orifice.

9. A method of cooling a rotatable side disk in a two-dimensional nozzle which receives exhaust gas from a gas turbine engine, said method comprising:
  attaching a liner assembly to said side disk, said liner assembly including
  liner means for shielding said side disk from said exhaust gas, said liner means impervious to said exhaust gas,
  impingement means for impinging said liner means with coolant from a supply means in said side disk, said impingement means secured in spaced relation to said liner means defining an exhaust plenum therebetween, and,
  exhaust means for exhausting said coolant from said exhaust plenum, said exhaust means including an exhaust assembly joined to said impingement means and substantially concentric with said supply means to accommodate rotation of the side disk;
  impinging said liner means with jets of coolant from said impingement means to cool said liner means;
  exhausting said coolant from said liner assembly through said exhaust means; and
  dumping said coolant overboard of said nozzle to ambient pressure.

* * * * *

UNITED STATES PATENT AND TRADEMARK OFFICE
CERTIFICATE OF CORRECTION

PATENT NO. : 5,079,912

DATED : January 14, 1992

INVENTOR(S) : Alfredo Cires, Richard D. Dickinson

It is certified that error appears in the above-identified patent and that said Letters Patent is hereby corrected as shown below:

Column 7, lines 52-53, change "connector" to --connected--

Signed and Sealed this

Twenty-seventh Day of April, 1993

Attest:

MICHAEL K. KIRK

*Attesting Officer*         *Acting Commissioner of Patents and Trademarks*